US008688896B2

(12) United States Patent
Nakamura et al.

(10) Patent No.: US 8,688,896 B2
(45) Date of Patent: Apr. 1, 2014

(54) HIGH SPEED WRITING MODE IN MEMORY CONTROLLER, NONVOLATILE STORAGE DEVICE, ACCESSING DEVICE, NONVOLATILE STORAGE SYSTEM, AND METHOD AND PROGRAM FOR WRITING DATA

(75) Inventors: Masahiro Nakamura, Hyogo (JP); Hirokazu So, Kyoto (JP); Masahiro Nakanishi, Kyoto (JP)

(73) Assignee: Panasonic Corporation, Osaka (JP)

( * ) Notice: Subject to any disclaimer, the term of this patent is extended or adjusted under 35 U.S.C. 154(b) by 26 days.

(21) Appl. No.: 13/058,352

(22) PCT Filed: May 13, 2010

(86) PCT No.: PCT/JP2010/003243
§ 371 (c)(1),
(2), (4) Date: Feb. 10, 2011

(87) PCT Pub. No.: WO2010/134300
PCT Pub. Date: Nov. 25, 2010

(65) Prior Publication Data
US 2011/0138117 A1    Jun. 9, 2011

(30) Foreign Application Priority Data
May 21, 2009    (JP) ................. 2009-122871

(51) Int. Cl.
*G06F 12/00* (2006.01)
*G06F 13/00* (2006.01)
*G06F 13/28* (2006.01)
(52) U.S. Cl.
USPC .................................. 711/103; 711/E12.008
(58) Field of Classification Search
USPC .......................................... 711/103, E12.008
See application file for complete search history.

(56) References Cited

U.S. PATENT DOCUMENTS 5,784,329 A * 7/1998 Blankenship et al. ........ 365/227
6,385,690 B1   5/2002 Iida et al.
(Continued)

FOREIGN PATENT DOCUMENTS

JP    11-023632 A    1/1999
JP    11-136627 A    5/1999
(Continued)

OTHER PUBLICATIONS

International Search Report for corresponding International Application No. PCT/JP2010/003243 mailed Jun. 15, 2010.
Form PCT/ISA/237 for corresponding International Application No. PCT/JP2010/003243 dated Jun. 15, 2010.
Japanese Office Action for corresponding Japanese Application No. 2011-514320 issued on Jun. 25, 2013.

*Primary Examiner* — Sheng-Jen Tsai
(74) *Attorney, Agent, or Firm* — Renner, Otto, Boisselle & Sklar, LLP

(57) ABSTRACT

A digital still camera performs temporary high-speed writing when capturing a large number of images in a short time. Lengthy processing for erased block allocation or copying performed inside a nonvolatile storage device may disable the captured images to be written completely (may cause some frames to drop). A nonvolatile storage system includes an access device (1001) and a nonvolatile storage device (1002). A button operation of a user on the access device (1001) causes the mode of data writing to the nonvolatile storage device (1002) to be switched. Temporary high-speed writing is performed into a physical block of a nonvolatile memory (27) from which a plurality of data pieces with different logical addresses and different data sizes have been erased. After the temporary high-speed writing, the written data is relocated into a user storage area (272), and an erased block is newly allocated for subsequent temporary high-speed data writing.

8 Claims, 10 Drawing Sheets

(56) References Cited

U.S. PATENT DOCUMENTS

| | | |
|---|---|---|
| 2004/0103241 A1* | 5/2004 | Chang et al. .................. 711/103 |
| 2005/0144358 A1* | 6/2005 | Conley et al. ................. 711/103 |
| 2005/0259498 A1* | 11/2005 | Nangle ......................... 365/226 |
| 2005/0289291 A1 | 12/2005 | Takahashi |
| 2006/0271942 A1 | 11/2006 | Yamanaka |
| 2007/0115730 A1* | 5/2007 | Randolph et al. ........ 365/185.29 |
| 2008/0104309 A1* | 5/2008 | Cheon et al. .................. 711/103 |
| 2008/0276038 A1* | 11/2008 | Tanaka et al. ................. 711/103 |
| 2009/0006725 A1 | 1/2009 | Ito et al. |

FOREIGN PATENT DOCUMENTS

| | | |
|---|---|---|
| JP | 2003-216511 A | 7/2003 |
| JP | 2006-011818 A | 1/2006 |
| JP | 2006-338718 A | 1/2006 |
| JP | 2006-155335 A | 6/2006 |
| JP | 2007-199828 A | 8/2007 |
| JP | 2008-152464 A | 7/2008 |

* cited by examiner

HIGH SPEED WRITING MODE IN MEMORY CONTROLLER, NONVOLATILE STORAGE DEVICE, ACCESSING DEVICE, NONVOLATILE STORAGE SYSTEM, AND METHOD AND PROGRAM FOR WRITING DATA

TECHNICAL FIELD

The present invention relates to a nonvolatile storage device, such as a semiconductor memory card using a nonvolatile memory, a memory controller that controls a nonvolatile memory, an access device, and a nonvolatile storage system including a nonvolatile storage device as well as an access device.

BACKGROUND ART

A variety of recording media including magnetic disks and optical discs are recently used to store digital data, such as still images, music content, and video data. Among such recording media, memory cards that mainly use nonvolatile memories like NAND-type flash memories as their recording elements are compact, and thus have been widely used in compact portable devices, such as digital still cameras, mobile telephone terminals, and video cameras.

A NAND-type flash memory can be written in units of pages (for example, in units of 512 bytes, 2 kilobytes, or 8 kilobytes). Before such writing, the NAND-type flash memory needs to be in erased state in units of blocks (for example, in units of 512 kilobytes or 1 megabyte) each consisting of a plurality of pages. More specifically, the NAND-type flash memory has the write characteristics described below. The NAND-type flash memory allows, like a magnetic disk, data to be written directly in units of pages into its erased blocks in which no data has ever been written. However, to enable data to be written into pages in which data has once been written, the NAND-type flash memory requires the recorded data to be erased in units of blocks to generate erased blocks, and then allows the new data to be written into the generated erased blocks in units of pages.

When an access device, such as a digital still camera, writes data to a nonvolatile storage device that uses a NAND-type flash memory, the nonvolatile storage device, in which data can be written only in erased blocks of the NAND-type flash memory, is required to perform the internal processing of first searching for an erased block to which data is to be written. When detecting an erased block as a result of searching, the nonvolatile storage device writes data received from the access device into the detected erased block in units of pages. When detecting no erased block, the nonvolatile storage device performs the processing described below:

(1) The nonvolatile storage device generates an erased block by erasing a physical block from which data has yet to be erased but that is unused because for example the latest data has been already copied to another block.

(2) The nonvolatile storage device then writes data received from the access device into the generated erased block in units of pages.

The above data writing performed by the nonvolatile storage device requires a longer processing time than data writing performed by other storage media, such as a dynamic random access memory (DRAM). Further, when the access device writes data less than the size of a single block, the nonvolatile storage device may need to read data from the previously recorded other physical block and copy the read data into the newly generated erased block. Such data writing performed by the nonvolatile storage device requires a longer processing time than normal writing.

To solve the above problem, a technique (a conventional nonvolatile storage device) described in, for example, Patent Literature 1 improves the data writing speed.

CITATION LIST

Patent Literature

Patent Literature 1: Japanese Unexamined Patent Publication No. 2008-152464

SUMMARY

Technical Problem

However, depending on the preceding data writing, the conventional nonvolatile storage device may be required to perform the above erased block generation, or the above copying (saving process) including reading existing data from another block and writing the read existing data and new data into an erased block. The erased block generation and the copying both require a long processing time. The need for such processing will lengthen the time required from when the access device transmits a data writing request to the nonvolatile storage device to when the data transmission is completed (the time required before the nonvolatile storage device completes writing of data transmitted from the access device).

When, for example, the access device needs to write a large amount of data to the nonvolatile storage device at one time, the erased block generation and/or the copying (saving process), which both require a long processing time, may further disable the data to be written completely to the nonvolatile storage device.

It is an object of the present invention to shorten the time required from when the access device transmits a data writing request to the nonvolatile storage device to when the data transmission is completed.

Solution Problem

The memory controller of the present application is a memory controller for controlling writing of data to a nonvolatile memory, and includes a host IF unit, a high-speed writing preparation unit, a high-speed writing processing unit, and a data relocation unit.

The host IF unit transmits and receives a command for controlling data writing to the nonvolatile memory, to or from an external unit that is external to the memory controller.

The high-speed writing preparation unit sets a mode of data writing to the nonvolatile memory to a high-speed writing mode when the host IF unit receives a high-speed writing preparation command from the external unit (switches to a high-speed writing mode).

The high-speed writing processing unit sequentially records write-target data to be written to the nonvolatile memory that has been received by the host IF unit from the external unit into a physical block of the nonvolatile memory from which data has been erased without using a logical address indicating a recording position of the write-target data when the mode of data writing is set to the high-speed writing mode (when the data writing mode is switched to the high-speed writing mode).

The data relocation unit relocates, based on the logical address, the data that has been recorded into the physical block by the high-speed writing processing unit into a physical block corresponding to the logical address when the host IF unit receives a command indicating termination of the high-speed writing mode from the external unit.

This enables the memory controller to record data to the nonvolatile memory at a higher speed than conventional memory controllers.

"Setting the mode of data writing to the high-speed writing mode" includes switching the data writing mode from a normal data writing mode (a mode in which a physical address corresponding to a logical address designated as a write-target address is obtained through logical to physical address conversion, and data is written to the obtained physical address) to a high-speed writing mode (a high-speed data writing mode).

Further, "sequentially recording" includes sequentially recording data into pages of a physical block designated as a data writing destination in the order from a first page toward a last page while data writing is being performed in the high-speed writing mode.

"Relocating" includes actually recording data that has been designated as write-target data using a write command at a physical address corresponding to a logical address designated using the write command.

Further, "sequentially recording write-target data to be written to the nonvolatile memory into a physical block of the nonvolatile memory from which data has been erased without using a logical address indicating a recording position of the write-target data" includes sequentially recording the write-target data into a physical block from which data has been erased and having a physical address different from a physical address corresponding to the logical address indicating the recording position of the write-target data to be written to the nonvolatile memory.

The memory controller may further include an erased-block allocating unit that allocates a physical block from which data has been erased based on a logical address and a size of the write-target data that is to be written in the high-speed writing mode. Information about the logical address and the size of the write-target data is provided in advance from the external unit.

This enables a large part of data written in the high-speed writing mode to be recorded into the erased physical bock, and enables data recording to be performed at a higher speed.

"Being provided in advance" includes being provided before data writing is performed in the high-speed writing mode.

The present invention may be embodied as a nonvolatile storage device including the above memory controller and a nonvolatile memory that is controlled by the memory controller.

An access device that is connected to the above nonvolatile storage device may include a temporary writing preparation unit, a temporary writing unit, and a temporary writing terminating unit. The temporary writing preparation unit transmits to the nonvolatile storage device a command instructing to switch (set) to a higher speed data writing mode (a high-speed data writing mode in which write-target data is to be recorded sequentially into a predetermined physical block of the nonvolatile memory irrespective of a logical address that is designated as an address at which the data is to be written). The temporary writing unit transmits user data and management data for managing the user data in a file system to the nonvolatile storage device. The temporary writing terminating unit transmits a message indicating termination of high-speed data writing to the nonvolatile storage device.

This enables the above access device to write data to the nonvolatile storage device at a higher speed.

"Switching" includes setting.

The access device may further include an erased-block designation unit that searches for an unoccupied area in a logical address space based on file system management information recorded in the nonvolatile memory, and provides information about the unoccupied area as information about a logical address and a data size to the nonvolatile storage device.

This enables the access device to provide information about an unoccupied area that can be used as an erased block to the nonvolatile storage device in an explicit manner.

The present invention may be embodied as a nonvolatile storage system including the above access device and the above nonvolatile storage device.

The present invention may be embodied as a data writing method for writing data to a nonvolatile memory using a command. The method includes the processes below:

(1) a command/data receiving process of receiving a command for controlling writing of data to the nonvolatile memory or data, (2) a high-speed writing preparation process of setting a mode of data writing to the nonvolatile memory to a high-speed writing mode when a high-speed writing preparation command is received in the command/data receiving process, (3) a high-speed writing process of sequentially recording write-target data to be written to the nonvolatile memory that has been received in the command/data receiving process into a physical block of the nonvolatile memory from which data has been erased without using a logical address indicating a recording position of the write-target data when the mode of data writing is set to the high-speed writing mode, and (4) a data relocating process of relocating, based on the logical address, data recorded into the physical block by the high-speed writing process into a physical block corresponding to the logical address when a command indicating termination of the high-speed writing mode is received in the command/data receiving process.

The present invention may also be embodied as a program for enabling a computer to implement the above data writing method.

Advantageous Effects

The present invention shortens the time required from when the access device transmits a data writing request to the nonvolatile storage device to when the data transmission is completed.

REFERENCE SIGNS LIST

Figure 1:
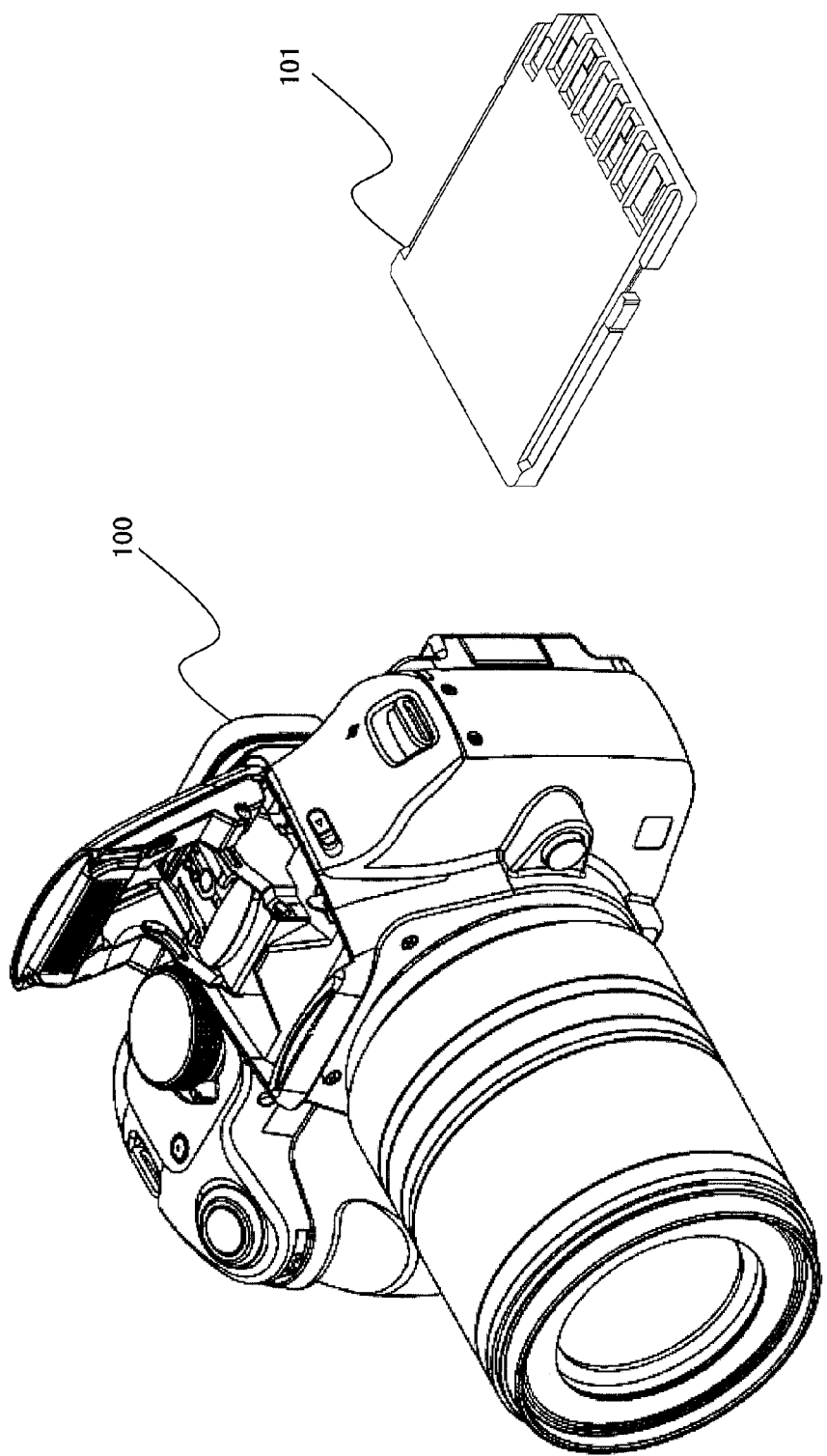
FIG. 1 shows an example of a nonvolatile storage system.

10 ROM
11 CPU
12 RAM
13 storage-device IF unit
14 imaging unit
15 input unit
16 display unit
17 bus
25 memory controller
27 nonvolatile memory
100 digital still camera
101 memory card
105 FS control unit
106 storage-device control unit
107 application control unit
108 temporary writing preparation unit
109 temporary writing unit
110 temporary writing terminating unit
111 erased-block designation unit
250 host IF unit
251 address management unit
252 memory access unit
253 high-speed writing preparation unit
254 high-speed writing processing unit
255 data relocation unit
256 erased-block allocating unit
271 management information area
272 user storage area
273 temporary data storage area
1001 access device
1002 nonvolatile storage device

DESCRIPTION OF EMBODIMENTS

First Embodiment

A first embodiment of the present invention will now be described with reference to the drawings.

FIG. 1 shows an example of a nonvolatile storage system according to the present embodiment. The nonvolatile storage system shown in FIG. 1 includes a digital still camera 100 and a memory card 101. The digital still camera 100 generates data that is to be recorded onto a nonvolatile storage device. The memory card 101 functions as the nonvolatile storage device onto which the data generated by the digital still camera 100 is recorded.

The digital still camera 100 captures an image and generates digital data representing the image.

The memory card 101 is set in its storage space (not shown) formed in the digital still camera 100, and is used in the retracted state. In response to a data recording request transmitted from the digital still camera 100, the memory card 101 records data representing for example a captured image onto its internal storage medium, such as a nonvolatile memory.

In this example, the digital still camera 100 is used as an access device, whereas the memory card 101 is used as a nonvolatile storage device.

Although the access device is the digital still camera in the example shown in FIG. 1, the present embodiment should not be limited to this structure. The access device may be a device of any category that generates data or receives data from an external unit and records the data onto the nonvolatile storage device. For example, the access device may be a device other than the digital still camera, such as a video camera, an audio recorder, or a broadcast receiving recorder.

In the same manner, although the nonvolatile storage device is the memory card in the present embodiment, the present embodiment should not be limited to this structure. The nonvolatile storage device may be another data recording apparatus, such as a hard disk apparatus.

1.1 Structure of Nonvolatile Storage System

Figure 2:
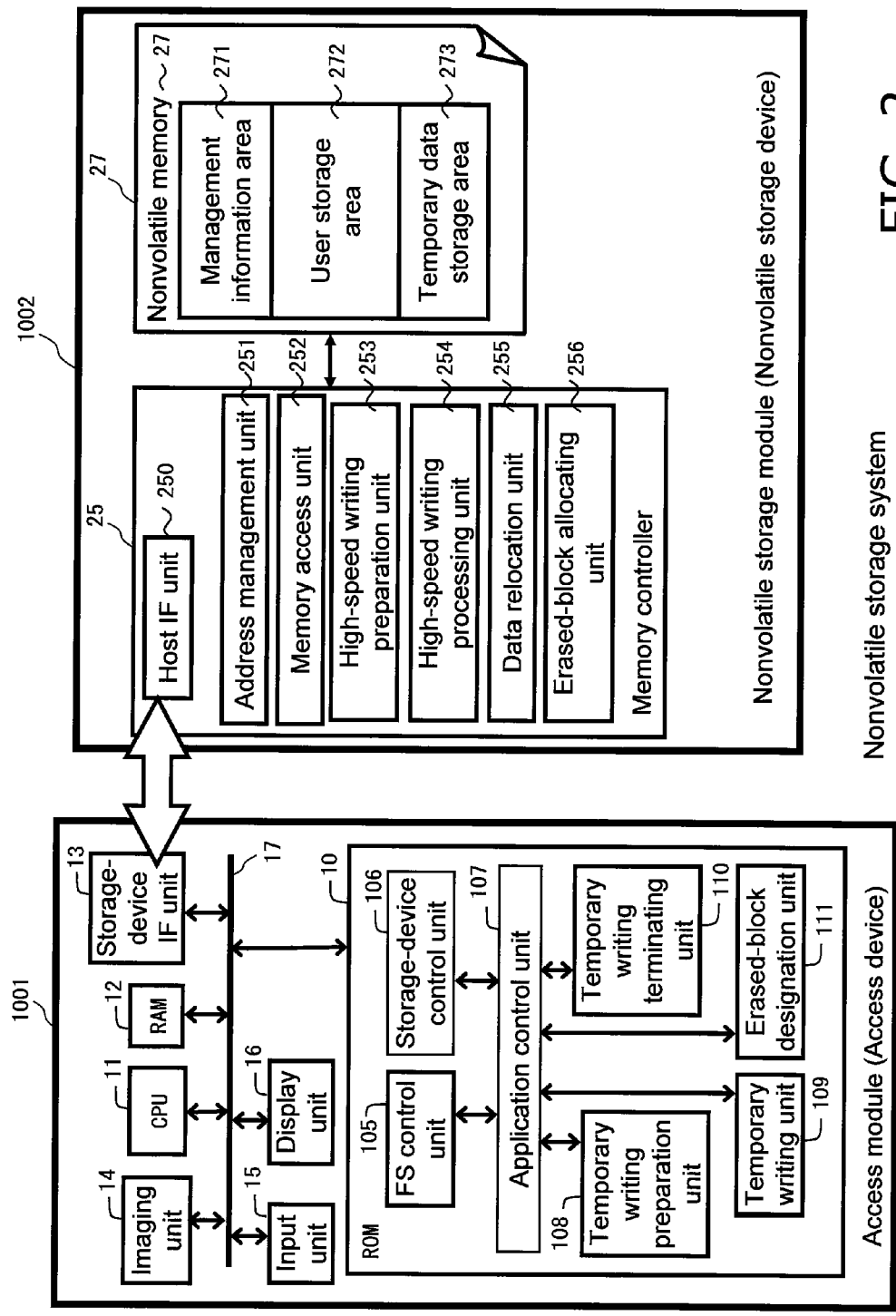
FIG. 2 is a functional block diagram of the nonvolatile storage system.

FIG. 2 is a functional block diagram of the nonvolatile storage system shown in FIG. 1.

In FIG. 2, the nonvolatile storage system includes an access device 1001 and a nonvolatile storage device 1002.

1.1.1 Structure of Access Device

The access device 1001 generates data that is to be written to the nonvolatile storage device 1002. As shown in FIG. 2, the access device 1001 in the present embodiment includes a read-only memory (ROM) 10, a CPU 11, a random-access memory (RAM) 12, a storage-device interface unit (hereafter referred to as a storage-device IF unit) 13, an imaging unit 14, an input unit 15, a display unit 16, and a bus 17.

The CPU 11 executes overall control of the access device 1001. More specifically, the CPU 11 controls other components (functional units) of the access device 1001 by executing a program stored in the ROM 10.

The ROM 10 stores programs used to control the access device 1001. The programs are executed by the CPU 11 using the RAM 12 as a temporary data storage area. The programs stored in the ROM 10 are executed in units of functions provided by components including a file system (FS) control unit 105, a storage-device control unit 106, an application control unit 107, a temporary writing preparation unit 108, a temporary writing unit 109, a temporary writing terminating unit 110, and an erased-block designation unit 111. These functions are implemented using software that can be executed by the CPU 11.

The RAM 12 may be used as an area for temporarily storing data that will be used when, for example, the CPU 11 executes the programs. The RAM 12 may also be used as an area for storing program data used to execute programs recorded on the ROM 10. The RAM 12 may also be used for other purpose.

The storage-device IF unit 13 functions as an interface part of the access device that connects the nonvolatile storage device 1002 and the access device 1001. Via the storage-device IF unit 13, control signals and data are transmitted and received to and from the nonvolatile storage device 1002.

The imaging unit 14 converts incident light from a subject entering through a lens of the digital still camera 100 to an electric signal to generate image data.

The input unit 15 includes a release button with which imaging is started or stopped, a switch button with which the imaging mode is switched between a single imaging mode and a continuous imaging mode, and other buttons for settings or adjustments. In the single imaging mode, only a single image is captured when the release button is pressed. In the continuous imaging mode, a plurality of continuous images are captured when the release button is pressed. The input unit 15 receives a user operation on these buttons. The input unit 15 outputs a signal indicating the received user operation to the CPU 11 and other units via the bus 17.

The display unit 16 is a functional unit that displays image data captured and generated by the imaging unit 14. The display unit 16 includes, for example, a liquid crystal panel.

The bus 17 may be a data wire for connecting the above functional units and allowing data to be transmitted between the functional units. Although the wiring shown in FIG. 2 represents the bus connection, the present embodiment should not be limited to this form of connection. The connection may be in another form.

The FS control unit 105, the storage-device control unit 106, the application control unit 107, the temporary writing preparation unit 108, the temporary writing unit 109, the temporary writing terminating unit 110, and the erased-block designation unit 111 may be partially or entirely formed using hardware.

The FS control unit 105 enables data writing or data reading to and from the nonvolatile storage device 1002 to be managed in units of files. In other words, the FS control unit 105 enables such data writing or reading to be managed using the file system. In the present embodiment, the FS control unit 105 uses a file allocation table (FAT) file system. However, the present invention should not be limited to this file system. The FS control unit 105 may use another file system, such as a new file system (NFTS) or a hierarchical file system (HSF). The FS control unit 105 may manage the storage area of the nonvolatile storage device 1002 using logical addresses.

The storage-device control unit 106 controls transmission and reception of data to and from the nonvolatile storage device 1002 via the bus 17 and the storage-device IF unit 13. More specifically, the storage-device control unit 106 designates a logical address at which the processing is to be started and the processing size in the logical address space that logically manages the storage area of the nonvolatile storage device 1002. The storage-device control unit 106 then performs, using a predetermined command or a predetermined protocol, the processing for writing or reading file system management information (FS management information) including a file allocation table (FAT) and a directory entry (DE) or writing or reading captured image data. To enable the processing for writing or reading the FS management information or the image data to be performed, the storage-device control unit 106 controls the nonvolatile storage device 1002 to transmit or receive information or data.

The application control unit 107 executes overall control of the access device 1001, such as control associated with power supply of the access device 1001, initialization of the access device 1001, and preparation, starting, and termination of the imaging based on programs for capturing images and operations input via the input unit 15.

The temporary writing preparation unit 108 transmits a command for temporarily changing the mode of writing data to the nonvolatile storage device 1002 to a high-speed writing mode as instructed by the application control unit 107.

The temporary writing unit 109 controls the imaging unit 14 and the storage-device IF unit 13 to write data to the nonvolatile storage device 1002 (temporarily) in the high-speed writing mode as instructed by the application control unit 107. When completing the control associated with high-speed writing of a predetermined amount of data, the temporary writing unit 109 instructs the temporary writing terminating unit 110 (described later) to terminate the temporary writing mode. To distinguish normal data writing (data writing that is not performed in the high-speed writing mode) from high-speed writing, the temporary writing unit 109 may transmit data to the nonvolatile storage device 1002 in high-speed data writing using a method different from the method used in normal data writing, or for example, using a transmission command system or a data transmission system different from those used in normal writing.

When instructed to terminate high-speed writing of data that is recorded onto the nonvolatile storage device 1002 by the application control unit 107 or by the temporary writing unit 109, the temporary writing terminating unit 110 controls the imaging unit 14 and also transmits a temporary writing terminating command to the nonvolatile storage device 1002 via the storage-device IF unit 13.

The erased-block designation unit 111 reads data from the management information area 271 of the nonvolatile storage device 1002 via the FS control unit 105. Based on the read information, the erased-block designation unit 111 then searches for an unoccupied area in the logical address space. The erased-block designation unit 111 transmits information about the detected unoccupied area to the nonvolatile storage device 1002. Based on the received information, the nonvolatile storage device 1002 relocates an unused physical block area of the user storage area 272 included in the nonvolatile memory 27 in a manner that the unused physical block area will be a part of the temporary data storage area 273. This generates an erased block allocated to the temporary data storage area 273.

1.1.2 Structure of Nonvolatile Storage Device 1.1.2.1 Memory Controller

As shown in FIG. 2, the nonvolatile storage device 1002 includes a memory controller 25 and a nonvolatile memory 27.

The memory controller 25 includes a host interface unit (host IF unit) 250, an address management unit 251, a memory access unit 252, a high-speed writing preparation unit 253, a high-speed writing processing unit 254, a data relocation unit 255, and an erased-block allocating unit 256.

The host IF unit 250 is an interface via which data and commands are transmitted and received to and from the access device 1001. Via the host IF unit 250, commands for controlling the access device 1001, such as control signals, ordinary file data including images and documents, file allocation tables (FATs), and directory entries (DEs), and other information, and responses to such commands are transmitted and received to and from the access device 1001.

The address management unit 251 manages the correspondence between a logical address designated by the access device 1001 and a physical address used to actually access the storage area of the nonvolatile memory 27. Addresses of data transmitted and received by the host IF unit 250 are specifically logical addresses that are managed by the FS control unit 105 included in the access device 1001, whereas the storage area of the nonvolatile memory 27 is managed using physical addresses. The address management unit 251 thus needs to manage the correspondence between such logical addresses and such physical addresses. The address management unit 251 uses a management table storing the correspondence between logical addresses and physical addresses, and converts a logical address to a physical address or a physical address to a logical address using the management table. Alternatively, the address management unit 251 may manage the correspondence between logical addresses and physical addresses with a method other than the method of using the management table. When, for example, the correspondence between logical addresses and physical addresses satisfies a predetermined relationship expressed using a mathematical expression, the address management unit 251 may manage the correspondence between logical addresses and physical addresses using a numerical expression, such as a mathematical expression, instead of using the management table.

The memory access unit 252 controls access to the nonvolatile memory 27, and performs the processing for recording data that is received by the host IF unit 250 onto the nonvolatile memory 27 or the processing for reading data from the nonvolatile memory 27 and transmitting the read data to an external unit via the host IF unit 250. To perform data recording or data reading to or from the nonvolatile memory 27, the memory access unit 252 accesses the nonvolatile memory 27 by designating a physical address obtained from the address management unit 251.

To record data onto the nonvolatile memory 27, the memory access unit 252 searches the nonvolatile memory 27 for an erased block into which data is to be recorded (determines whether the nonvolatile memory 27 has an erased block). When detecting an erased block as a result of searching, the memory access unit 252 performs the processing for writing data received from the access device 1001 in units of pages into the detected erased block. When detecting no erased block, the memory access unit 252 erases an unused block to generate an erased block and allocates the erased block to the temporary data storage area, and then performs the processing for writing data received from the host IF unit in units of pages into the allocated erased block.

When receiving a data writing request to write data smaller than the size of a single block from the host IF unit 250, the memory access unit 252 reads valid data from a physical block corresponding to the data, and performs the processing for writing both the read data and the data requested by the transmitted writing request into the newly allocated erased block. In this case, even when the writing request is associated with the data update of a single page included in a physical block, the memory access unit 252 is required to copy not only the data of the single page but also other data stored in the physical block.

Based on a temporary writing preparation command generated by the temporary writing preparation unit 108 and received by the host IF unit 250, the high-speed writing preparation unit 253 changes the settings for data writing in a manner that write data subsequently requested by the access device 1001 will be written into the temporary data storage area 273.

The high-speed writing processing unit 254 writes data received from the access device 1001 via the host IF unit 250, or specifically file data of an image, a FAT, or a DE, into the temporary data storage area 273, together with information about a logical address at which the data is to be recorded and the size of the data.

The high-speed writing processing unit 254 may store the information about the logical address and the size, which is recorded together with the data, into a redundant part of each page of the temporary data storage area 273, or may store such information in the temporary data storage area 273 in a manner separately from the data. The high-speed writing processing unit 254 may record the data, the logical address, and the size partially into a RAM (not shown) other than the nonvolatile memory 27.

Based on a temporary writing terminating command transmitted from the temporary writing terminating unit 110 of the access device 1001, the data relocation unit 255 reads the data and the information about the logical address and the size from the temporary data storage area 273, and copies the read data and the read information into an erased block generated using the user storage area 272. The data relocation unit 255 also instructs the address management unit 251 to update the correspondence between logical addresses and physical addresses, and controls the memory access unit 252 to apply the updates to the management information area 271. This data relocation process will be described in detail later.

The erased-block allocating unit 256 refers to the management information area 271 based on the information about the logical address of the block that can be erased and the size received by the host IF unit 250, and erases the corresponding physical block to generate an erased block, and enters information about the generated erased block in the management information area 271 and also allocates the newly generated erased block to the temporary data storage area 273.

1.1.2.2 Nonvolatile Memory

In the present embodiment, the nonvolatile memory is used as a recording medium for storing data.

Figure 3:
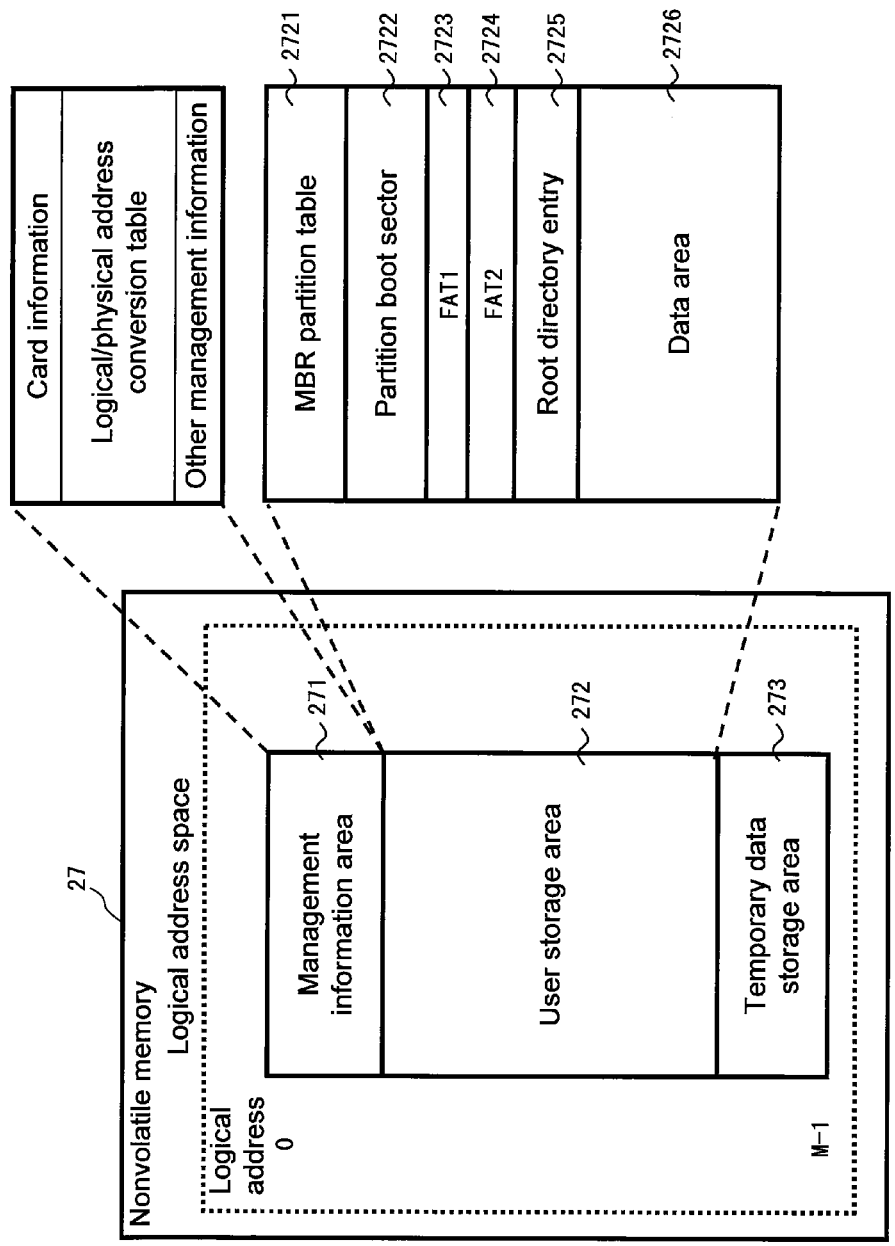
FIG. 3 shows a logical address space of a nonvolatile memory.

When the nonvolatile memory 27 is, for example, a NAND-type flash memory, data needs to be erased from the memory in units of blocks and data needs to be written to the memory in units of pages. FIG. 3 shows an example of the internal structure (logical address space) of the NAND-type flash memory. As shown in FIG. 3, the storage area of the nonvolatile memory 27 includes a management information area 271, a user storage area 272, and a temporary data storage area 273 when its addresses are managed using a logical address space.

The management information area 271 may store a management table showing the correspondence between a logical address space and a physical address space that are used to manage the storage area of the nonvolatile memory 27, as well as information used to manage erased blocks and unused blocks.

The address management unit 251 uses the management table when actually reading data from the nonvolatile memory 27 or writing data to the nonvolatile memory 27.

An erased block refers to a block that has no corresponding logical address, and whose storage area has been erased.

An unused block refers to a block that has no corresponding logical address, and whose storage area stores previously recorded data that has yet to be erased. In other words, an unused block is the same as an erased block in that it has no corresponding logical address, but differs from an erased block in that its storage area stores previously recorded data that has yet to be erased.

An erased block may be assumed as a special block among unused blocks. The management information area 271 stores the information used to manage erased blocks and unused blocks and the management table.

The management information area 271 may further store other information including, for example, information about the capacity of the nonvolatile memory 27 (memory capacity) (specifically, for example, card information when the nonvolatile storage device 1002 is a secure digital (SD) card) and information about the data reading speed or the data writing speed of the nonvolatile storage device 1002.

The user storage area 272 is an area for storing data that is requested by a writing request transmitted from an external unit of the nonvolatile storage device 1002. The user storage area 272 is typically an area from which data can be read or to which data can be written as instructed by, for example, a user of the nonvolatile storage device 1002, via the the access device 1001. The user storage area 272 may also store image data captured by the access device 1001 of the present embodiment in accordance with the management method defined by the file system.

The temporary data storage area 273 is an area for temporarily storing data that is to be written by the high-speed writing processing unit 254.

Figure 5:
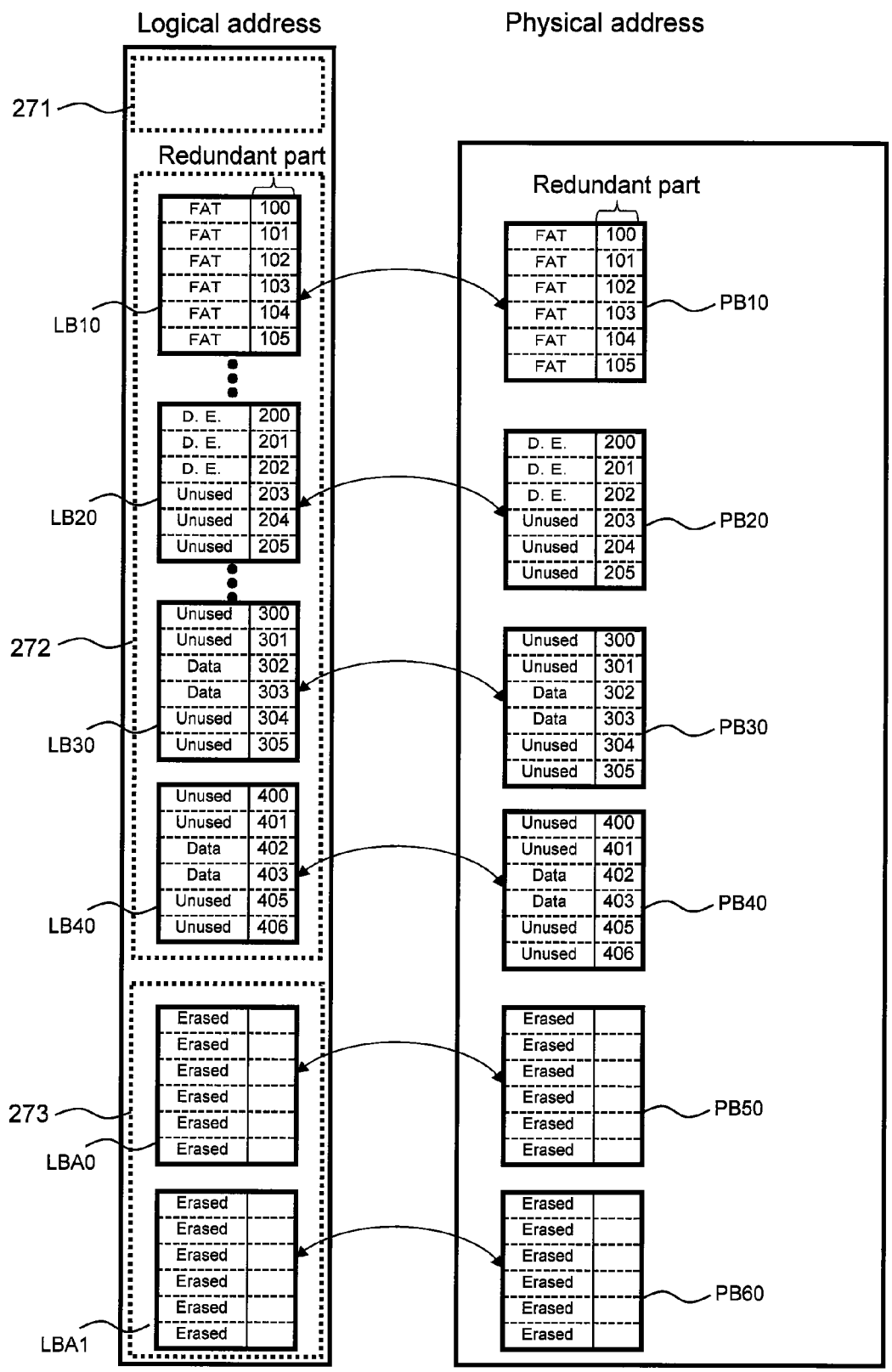
FIG. 5 shows the initial state of a logical address space and a physical address space.

FIG. 5 shows an example of the correspondence between logical blocks (hereafter, LBs) and physical blocks (hereafter, PBs) of the nonvolatile memory 27 in the present embodiment. In FIG. 5, logical blocks are assumed to correspond to physical blocks with the same reference numerals as the logical blocks. For example, LB10 corresponds to PB10, and LB20 to PB20. Further, each logical block is assumed to have a predetermined range of logical addresses that can be its corresponding addresses. To read, for example, data at logical address 102 (the address of LB10 whose redundant part stores 102) from the nonvolatile memory 27, the management table is used to determine a physical block corresponding to LB10 including logical address 102. In the example of FIG. 5, the physical block corresponding to LB10 is determined as PB10 by referring to the management table. The physical address of PB10 whose redundant part stores 102 corresponding to logical address 102 is then identified by referring to each redundant part of PB10. The data is then read from the identified physical address. In this manner, data at logical address 102 is read from the nonvolatile memory 27.

1.2 Operation of Nonvolatile Storage System

Figure 4:
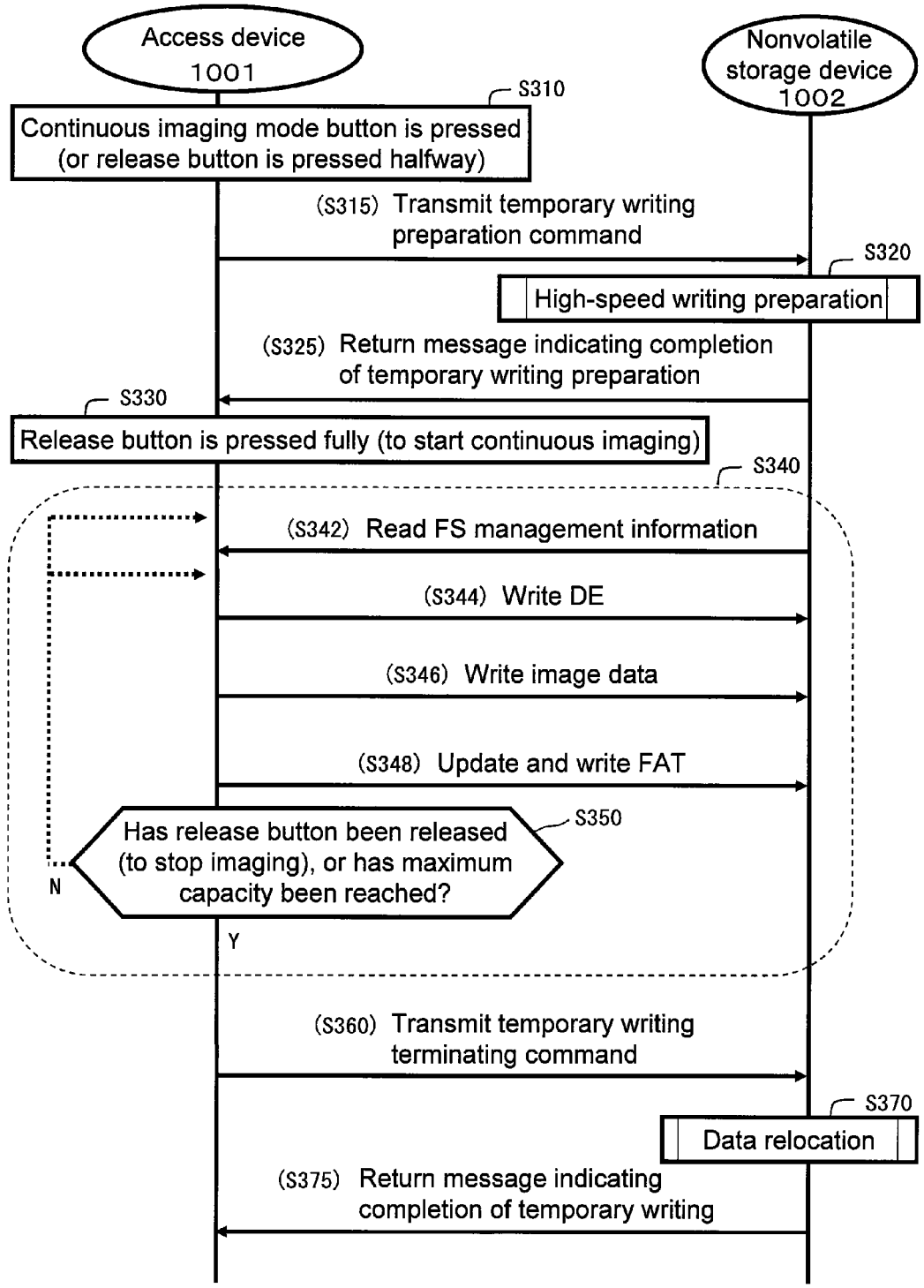
FIG. 4 shows a sequence of operation performed between an access device and a nonvolatile storage device according to a first embodiment of the present invention.

The operation performed by the nonvolatile storage system of the present embodiment when the user performs temporary high-speed writing will now be described with reference to FIG. 4. The temporary high-speed writing may be performed when, for example, a large amount of data is to be recorded onto the nonvolatile storage device 1002 in a relatively short time (for example, data of several hundred megabytes is to be recorded in one second) during continuous imaging performed by the digital still camera 100.

S310 to S330:

In step S310, the access device 1001 (the digital still camera 100) detects that the imaging mode has been switched to the continuous imaging mode via, for example, the input unit 15.

When the access device 1001 detects the above switching of the imaging mode, the temporary writing preparation unit 108 transmits a temporary writing preparation command to the nonvolatile storage device 1002 to prepare for imaging performed in the continuous imaging mode in step 315. The command may be transmitted when the release button, which is used to focus the lens, is pressed halfway by the user in the continuous imaging mode.

In step S320, in response to the temporary writing preparation command received by the host IF unit 250 of the nonvolatile storage device 1002, the high-speed writing preparation unit 253 changes the settings associated with control over writing to the nonvolatile memory 27 as well as data management in a manner that write data subsequently requested by the access device 1001 will be written into the temporary data storage area 273.

In step S325, the nonvolatile storage device 1002 returns to the access device 1001 a response message indicating that the preparation for continuous imaging (preparation for high-speed data writing) has been completed.

In step S330, the continuous imaging is started when the release button of the access device 1001 (the digital still camera 100) is pressed fully by the user. The temporary writing unit 109 obtains image data generated through the continuous imaging.

S340:

In step S340, the access device 1001 performs the processing for sequentially writing data of a plurality of continuous images that have been captured through the continuous imaging into the nonvolatile storage device 1002 while controlling the FS control unit 105.

The processing performed by the FS control unit 105 in step S340 will now be described in detail using the processing performed in steps S342 to S350.

In step S342, the FS control unit 105 reads FS management information from the user storage area 272 of the nonvolatile storage device 1002, and searches for an unoccupied area (unused cluster) in the logical address space using the FATs.

When detecting an unoccupied area, the FS control unit 105 writes a DE at the data recording start position (or for example with the first cluster number) into the nonvolatile storage device 1002 in step S344.

The FS control unit 105 subsequently writes the captured image data to the nonvolatile storage device 1002 in step S346.

In step S348, the FS control unit 105 writes the updated FAT data to the nonvolatile storage device 1002. When the image data fails to be written entirely in the cluster, the FS control unit 105 searches for another unoccupied cluster area in the FAT in step S342, and repeats the processing for writing in steps S346 and S348. The FS control unit 105 repeats the processing until completely writing the data corresponding to a single image. The FS control unit 105 then updates DEs to determine the eventual file size.

In step S350, the access device 1001 determines whether the release button is released, or whether the number of continuously captured images exceeds a predetermined maximum number. As a result, when determining that the continuous imaging is to be continued, the access device 1001 writes a plurality of images (image data) to the nonvolatile memory 27 of the nonvolatile storage device 1002 by repeating the processing in steps S342 to S348.

In the manner described in detail above, the access device 1001 performs the processing in step S340.

The processing performed by the nonvolatile storage device 1002 in step S340 including the state of data recording in the nonvolatile memory 27 will now be described. For ease of explanation, the nonvolatile storage device 1002 is assumed to be in the state shown in FIG. 5 before the imaging is started.

In step S342, the nonvolatile storage device 1002 reads FS management information from the user storage area 272 (for example, the FAT information stored in LB 10) in response to a request from the access device 1001.

In steps S344 to S348, the high-speed writing processing unit 254 of the nonvolatile storage device 1002 sequentially writes data transmitted from the access device 1001 into erased blocks included in the temporary data storage area 273 of the nonvolatile memory 27, which have been allocated in advance to such write data. When completing data writing into a single erased block, the high-speed writing processing unit 254 writes data into a next erased block. This processing of the nonvolatile storage device 1002 is repeated until the nonvolatile storage device 1002 receives a temporary writing terminating command from the access device 1001.

Figure 6:
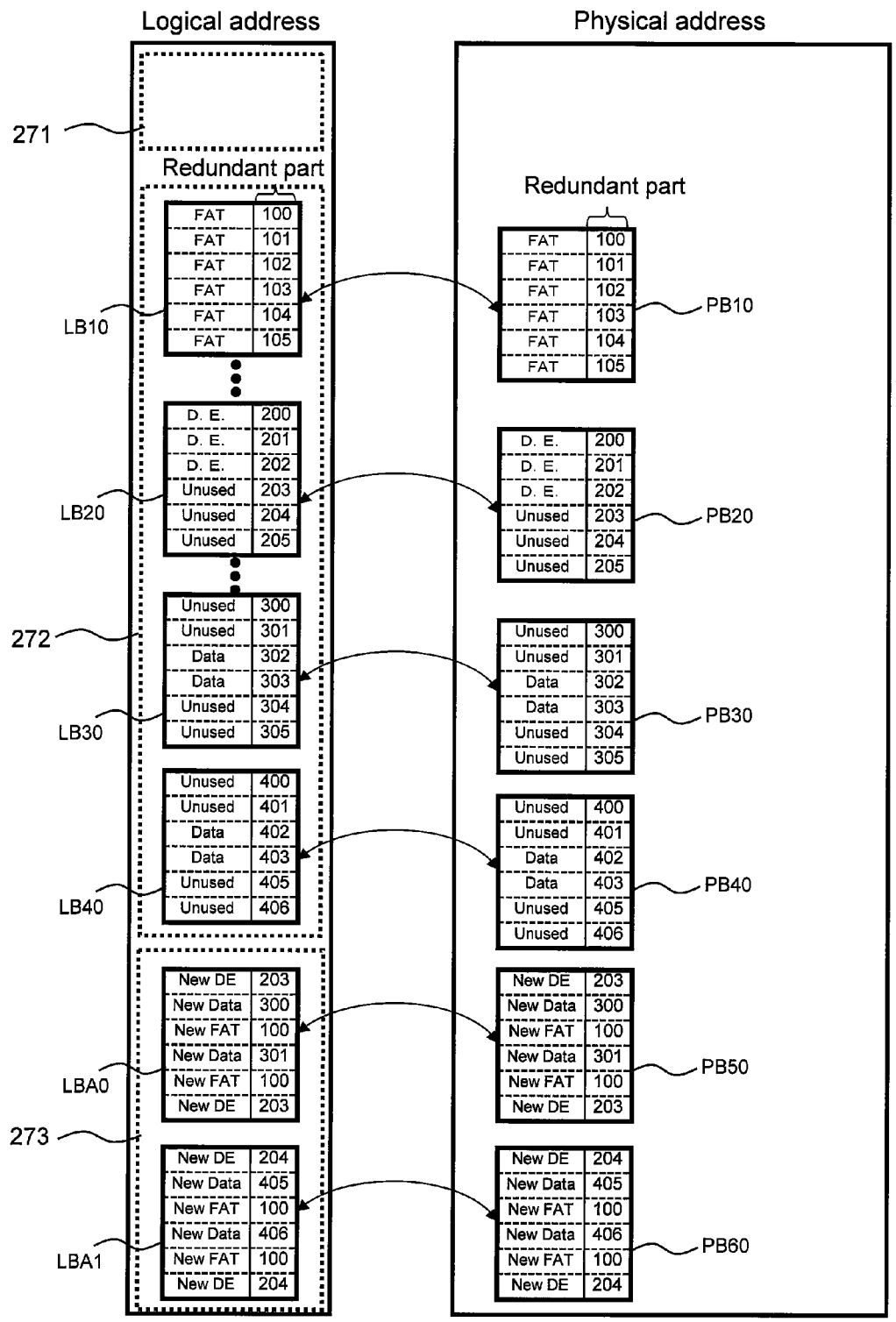
FIG. 6 shows the state of the logical address space and the physical address space during high-speed writing.

The above processing of the nonvolatile storage device 1002 is repeated to write, for example, new DEs and new image data into PB50 and PB60. As a result, the nonvolatile storage device 1002 will be in the state shown in FIG. 6 for example. In this state, information about the logical address and the size of the transmitted data is stored in each redundant part of PB50 and PB60. Although the information about the logical address and the data size is stored in the redundant part of each block in this example, the information about the logical address and the data size may be stored and managed in another area of the nonvolatile memory 27, or the information about the logical address and the data size may be stored in a RAM included in the memory controller 25.

S360 to S375

The processing performed by the access device 1001 when the continuous imaging is terminated will now be described.

When the access device 1001 terminates the continuous imaging, the temporary writing terminating unit 110 transmits a temporary writing terminating command to the nonvolatile storage device 1002 (step S360).

When the nonvolatile storage device 1002 receives the temporary writing terminating command, the data relocation unit 255 relocates the FS management information and the image data that have been newly written in the temporary data storage area 273, or more specifically the new FATs, the new DEs, and the new data into the user storage area 272 in step S370. The relocation process will be described in detail later.

In step S375, the nonvolatile storage device 1002 returns to the access device 1001 a response message indicating that the relocation process has been completed. This terminates the processing for continuous imaging (high-speed data writing). When the user subsequently performs continuous imaging, the processing for continuous imaging is started from step S310.

Data Relocation Process

Figure 9:
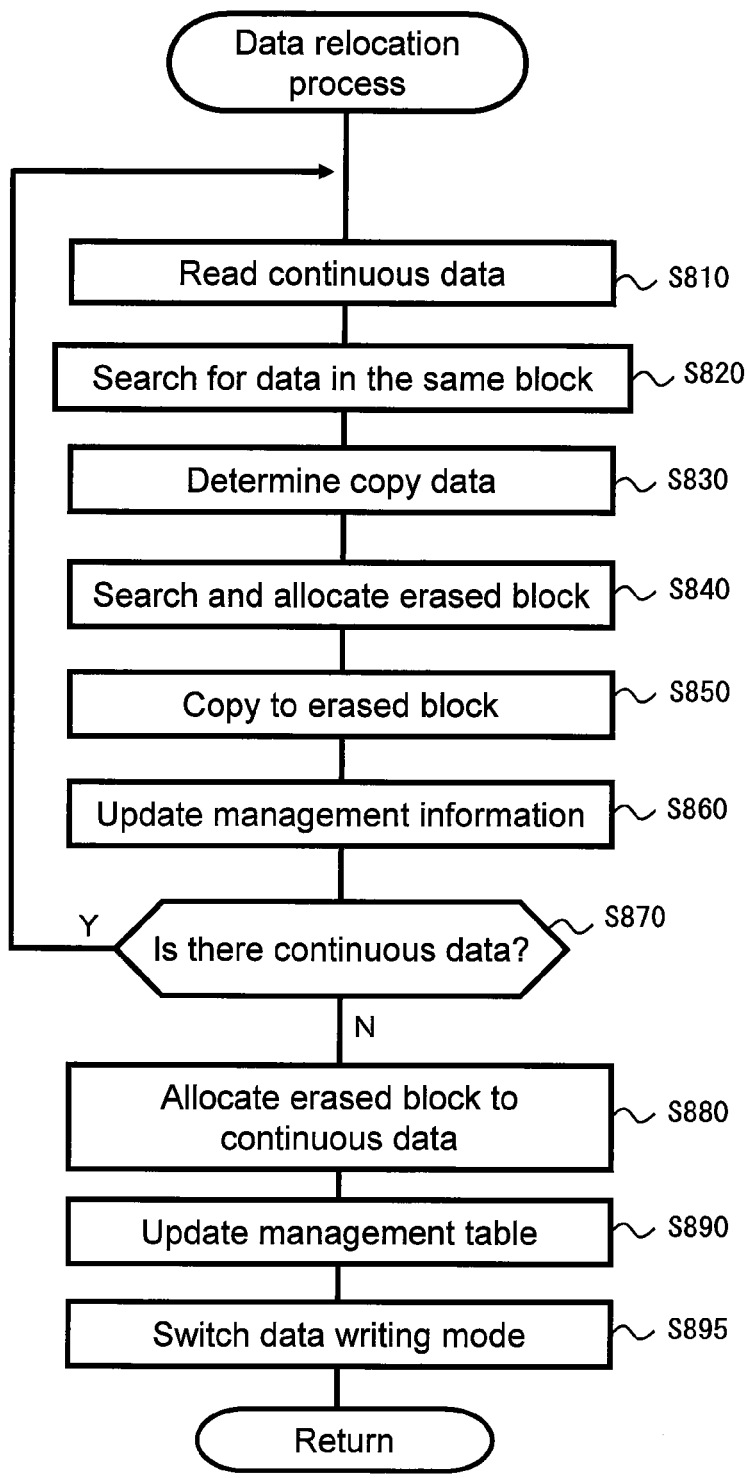
FIG. 9 is a flowchart showing a data relocation process.

An example of the data relocation process performed in step S370 will now be described with reference to FIGS. 7 and 9.

Figure 7:
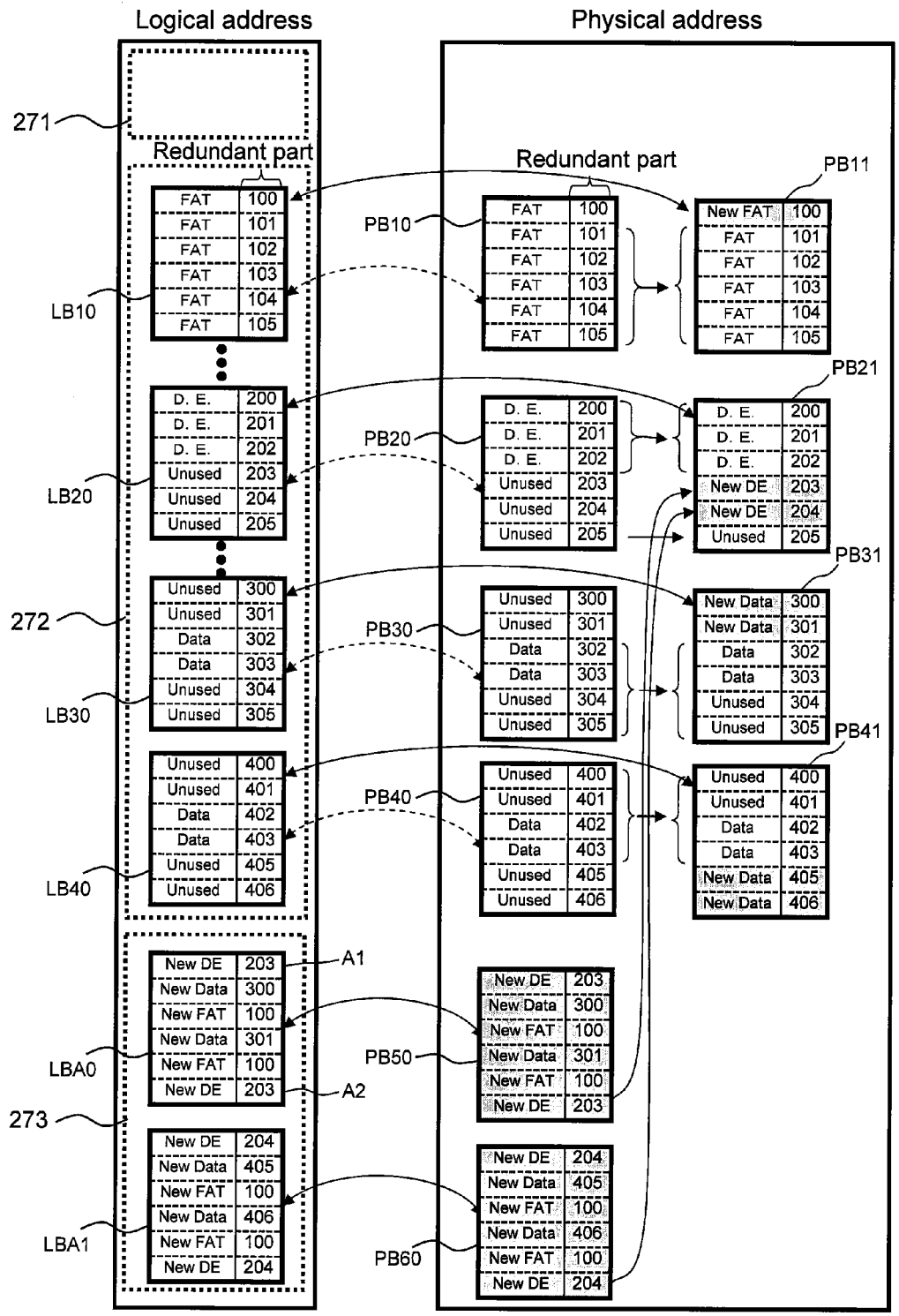
FIG. 7 shows the state of the logical address space and the physical address space during data relocation.

As shown in FIG. 7, the image data representing a plurality of continuous images captured through continuous imaging and FS management information associated with the image data are allocated to LBA0 and LBA1 included the temporary data storage area 273. Physical blocks corresponding to these logical blocks can be identified using the management table stored in the management information storage area 271. More specifically, the physical bocks corresponding to LBA0 and LBA1 can be determined as PB50 and PB60.

In step S810, the data relocation unit 255 first reads the image data obtained through continuous imaging including the redundant parts. In the example shown in FIG. 7, the data relocation unit 255 reads the new DE at the top (with logical address 203) in PB50.

S820:

In step S820, the data relocation unit 255 obtains the logical address stored in each redundant part, and searches for a plurality of pieces of data with the same logical address stored in the temporary data storage area 273. In the example shown in FIG. 7, the logical bock LBA0 has two pieces of data with logical address 203, which are stored in pages A1 and A2. In this case, the data relocation unit 255 detects these two pieces of data as the data with logical address 203.

The data relocation unit 255 further searches for other pieces of data with the same logical address that are to be included in the same LB.

S830:

In step S830, the data relocation unit 255 determines that the plurality of pieces of data that are to be written in the same LB detected in step S820 are target data to be copied. In the example shown in FIG. 7, the data relocation unit 255 determines that the new data with logical address 300 and new data with logical address 301 stored in the logical block LBA0 are data to be written into the same logical block LB30 (as the target data to be copied).

In the example shown in FIG. 7, the data relocation unit 255 determines that the data stored in page A2 of logical block LBA0 (the latest piece of data when the plurality of pieces of data with the same logical address are detected) is the copy target data (target data to be copied into the logical block LB20) of the new DE with logical address 203.

S840:

In step S840, the data relocation unit 255 searches for an erased block based on information stored in the management information area 271. When detecting no erased block, the data relocation unit 255 erases an unused block to generate an erased block and allocates the generated erased block to the temporary data storage area.

S850:

In step S850, the data relocation unit 255 writes the data detected in step S820 into the allocated erased block. When the data detected in step S820 does not fill all the pages included in the PB, the data relocation unit 255 reads data from the previously written logical block and writes the read data.

In the example shown in FIG. 7, PB21 is used as an erased block. The new DE with logical address 203 included in PB50 and the new DE with logical address 204 included in PB60 are copied into PB21. In FIG. 7, the temporary data storage area 273 stores two pieces of data with logical address 203 in the single logical block and two pieces of data with logical address 204 in the single logical block. One of the two pieces of data that has been written later (the latest one of the two pieces of data) is copied. In this state, PB21 has pages in which data is yet to be written. The previously written pieces of data with logical addresses 200, 201, 202, and 205 of PB20 are copied into these pages.

S860:

In step S860, the address management unit 251 updates the management table. More specifically, the address management unit 251 changes the physical block corresponding to the logical addresses 200 to 205 in LB20 from PB20 to PB21, and updates the status of PB20 to be an unused block.

S870:

In step S870, the nonvolatile storage device 1002 determines whether there is other data continuous to the previous image data, which is captured through continuous imaging and used as the target data for temporary writing in step S810. When detecting other data continuous to the previous target data, the processing returns to step S810. In step S810, the continuous image data obtained through continuous imaging is relocated. In the example shown in FIG. 7, the new DE (with logical address 203) included in PB50 is first relocated, and then the processing for relocating the new data (with logical address 300) is performed subsequently. When the data relocation process for all pieces of data obtained through continuous imaging is completed in step S870, the processing advances to step S880.

S880:

To allocate a new erased block to the temporary data storage area 273, the address management unit 251 searches for an erased block based on information stored in the management information area 271 in step S880. When detecting an erased block, the address management unit 251 allocates the detected erased block to the temporary data storage area 273. When detecting no erased block, the address management unit 251 erases an unused block to generate an erased block and allocates the generated erased block to the temporary data storage area.

S890:

In step S890, the address management unit 251 changes the management table in a manner that the allocated erased block will be usable in the temporary data storage area 273. In one example, LBA0 and LBA1 included in the temporary data storage area 273 correspond to PB50 and PB60. In this case, when the address management unit 251 searches for an erased block and detects PB51 as an erased block, the address management unit 251 allocates PB51 to the temporary data storage area 273. When detecting no erased block, the address management unit 251 searches for an unused block, and allocates the unused block to the temporary data storage area 273. In this example, PB20 is detected as an unused block.

Figure 8:
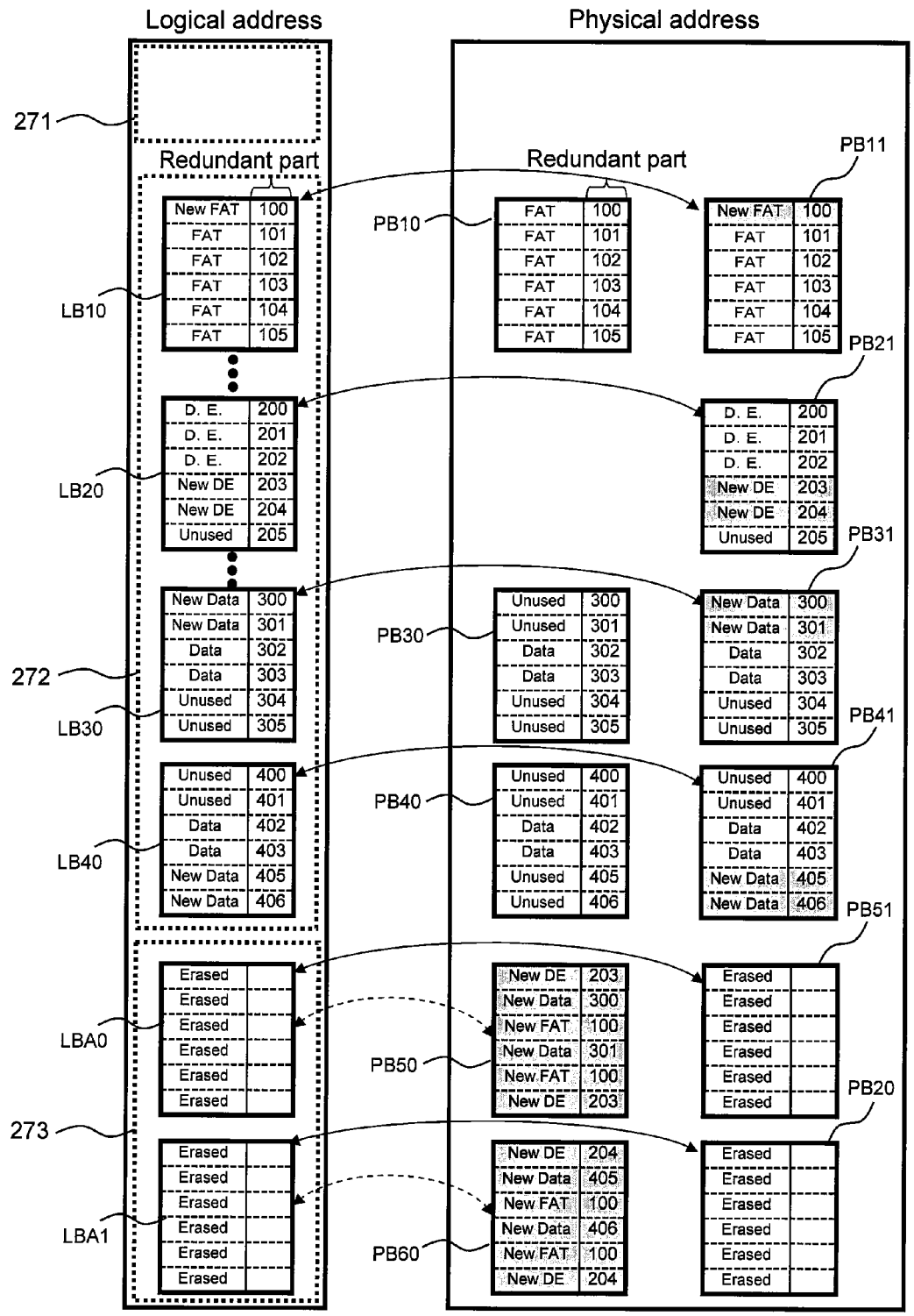
FIG. 8 shows the state of the logical address space and the physical address space after data relocation.

Thus, the address management unit 251 allocates PB20 to the temporary data storage area 273. The address management unit 251 further changes the status of each of PB50 and PB60 to be an unused block. As a result, LBA0 and LBA1 correspond to PB51 and PB20 as shown in FIG. 8.

S895:

In step S895, the nonvolatile storage device 1002 changes the settings for data writing in a manner that write data subsequently requested by the access device 1001 will not be written into the temporary data storage area 273 but will be written into the normal user storage area 272.

This completes the data relocation process.

In the nonvolatile storage system of the present embodiment, the nonvolatile storage device 1002 records data into the temporary recording area in the sequence in which the data is received from the access device 1001 during high-speed data recording irrespective of the recording position (logical address) of the data. This enables the access device 1001 to perform high-speed data writing to the nonvolatile storage device 1002. When the high-speed writing (the high-speed data recording process) is completed, the nonvolatile storage device 1002 refers to the logical address and other information associated with the data recorded in the temporary data storage area, and relocates the data that has been recorded in the temporary recording area into the user storage area. As a result, the nonvolatile storage system of the present embodiment enables the high-speed writing of data (the high-speed data recording process) to be performed while maintaining data consistency.

As a result, the nonvolatile storage system of the present embodiment shortens the time required from when the access device transmits a data writing request to the nonvolatile storage device to when the data transmission is completed.

Second Embodiment

The first embodiment assumes that a predetermined number of erased blocks are constantly allocated to the temporary data storage area 273. However, while the storage capacity of the nonvolatile memory 27 is constant, allocating a large number of erased blocks to the temporary data storage area 273 will relatively reduce the user storage area 272. The present embodiment solves this problem with a method that will be described with reference to FIG. 10.

The present embodiment differs from the first embodiment in the processing from steps S930 to S936. The other steps are the same as described in the first embodiment, and will not be described. The components in the present embodiment that are the same as the components in the above embodiment are given the same reference numerals as those components.

S310:

In step S310, the user, who intends to perform continuous imaging, presses a switch button of the access device 1001 (digital still camera) to switch the imaging mode to the continuous imaging mode. The temporary writing preparation unit 108 included in the access device 1001 then starts the preparation for imaging performed in the continuous imaging mode.

S315:

In step S315, the access device 1001 transmits a temporary writing preparation command to the nonvolatile storage device 1002.

S320:

In step S220, in response to the temporary writing preparation command received by the host IF unit 250 included in the nonvolatile storage device 1002, the high-speed writing preparation unit 253 changes the settings for data writing in a manner that write data subsequently requested by the access device 1001 will be written into the temporary data storage area 273. The high-speed writing preparation unit 253 further determines whether the temporary data storage area 273 includes an erased block based on information stored in the management information area 271. When detecting an erased block, the high-speed writing preparation unit 253 allocates the detected block to write data. When detecting no erased block, the high-speed writing preparation unit 253 erases an unused block to generate an erased block and allocates the generated erased block to write data.

S325:

In step S325, the access device 1001 receives a message indicating a result of the preparation for high-speed writing from the nonvolatile storage device 1002. When successfully allocating an erased block in step S320, the access device 1001 receives a message indicating that the preparation for high-speed writing has been completed successfully. When failing to allocate an erased block successfully in step S320, the access device 1001 receives a message indicating that the preparation for high-speed writing has been incomplete, together with a required size of data to which an erased block has failed to be allocated.

S930:

In step S930, when the access device 1001 has received a message indicating that the preparation for high-speed writing has been completed successfully from the nonvolatile storage device 1002, the processing advances to step S330. In step S330, the nonvolatile storage device 1002 waits for an operation to start continuous imaging (an instruction to start high-speed writing for example) performed by the access device 1001. When the access device 1001 has received a message indicating that the preparation for high-speed writing has been incomplete from the nonvolatile storage device 1002, the processing advances to step S933.

S933:

In step S933, the erased-block designation unit 111 reads FS management information from the user storage area 272 of the nonvolatile storage device 1002, and searches for an unoccupied area (unused cluster) having the required size from the file system based on the read FS management information, or in particular, based on the FAT information etc.

S934:

In step S934, the erased-block designation unit 111 provides information about the logical address and the size of the unoccupied area of the user storage area 272 in the FAT detected in step S933 to the nonvolatile storage device 1002 using an erased-block designation command. Information about two or more designated ranges may be provided as the information about the logical address and the size that is transmitted using the erased-block designation command. For example, information about a plurality of ranges, such as a range of 1 megabyte from logical address 10000 and a range of 2 megabytes from logical address 20000, may be provided.

S935:

In step S935, the erased-block allocating unit 256 obtains the corresponding physical block of the user storage area 272 based on the information about the logical address and the size designated using the erased-block designation command. The erased-block allocating unit 256 erases the obtained physical block as necessary, and then relocates the physical block of the user storage area 272 into the temporary data storage area 273. This relocation may be performed by, for example, updating information about each physical block stored in the management information area 271, or specifically information about an area to which each physical block belongs.

S936:

In step S936, the nonvolatile storage device 1002 transmits, to the access device 1001, a message indicating that an erased block has been generated and allocated to the temporary data storage area 273 through the processing in step S935.

S330 to S375:

The subsequent processing, or the processing in steps S330 to S375, is performed with the same method as described in the first embodiment, and will not be described.

When the processing of up to step S375 is completed, the nonvolatile storage device 1002 again updates the management information area 271 to change the attributes of physical blocks corresponding in one-to-one to the physical blocks whose attributes have been changed from the user storage area 272 to the temporary data storage area 273. The nonvolatile storage device 1002 updates the management information area 271 to change the attributes of such physical blocks from the temporary data storage area 273 to the user storage area 272.

The above processing eliminates the need for constantly allocating a predetermined number of erased blocks to the temporary data storage area 273 in the nonvolatile storage system of the present embodiment, and enables physical blocks for temporary storage to be obtained as necessary using, for example, the user storage area. As a result, the nonvolatile storage system of the present embodiment enables temporary high-speed writing to be performed without logically reducing the storage capacity of the user storage area 272.

In the same manner as in the first embodiment, the nonvolatile storage system of the present embodiment shortens the time required from when the access device transmits a data writing request to the nonvolatile storage device to when the data transmission is completed.

Other Embodiments

Although the present embodiment has been described based on the above embodiments, the present invention should not be limited to the above embodiments. The present invention may be modified freely without departing from the scope and spirit of the invention. Numerical values described in the present embodiment are mere examples, and other numerical values may be used. The components used in the embodiments may be partially eliminated, or the processing of each component described in the embodiments may be performed in a different sequence.

Identification information, such as a flag, may be set when a first piece of a plurality of pieces of data obtained through continuous imaging is written into the temporary data storage area 273. The set identification information may be deleted when the data relocation process is completed. This method is preferable because the identification information can be used when an unexpected situation occurs, such as when the power is shut down or the nonvolatile storage device is disconnected during the data relocation process. By using the identification information, the nonvolatile storage device can resume processing continuously from the suspended processing once the power is turned on.

Although this method requires a longer time for the data relocation process and thus may increase the risk of an unexpected situation, this method prevents the captured image data from being lost. Further, when an unexpected situation of the nonvolatile storage system occurs before the data relocation process is performed, a block that is not an erased block may be allocated to the temporary data storage area 273. In this case, the block may be erased through the high-speed writing preparation performed in step S320, the block may be erased once the power is turned on, or the block may be erased before data writing into the temporary data storage area 273 is performed.

Figure 10:
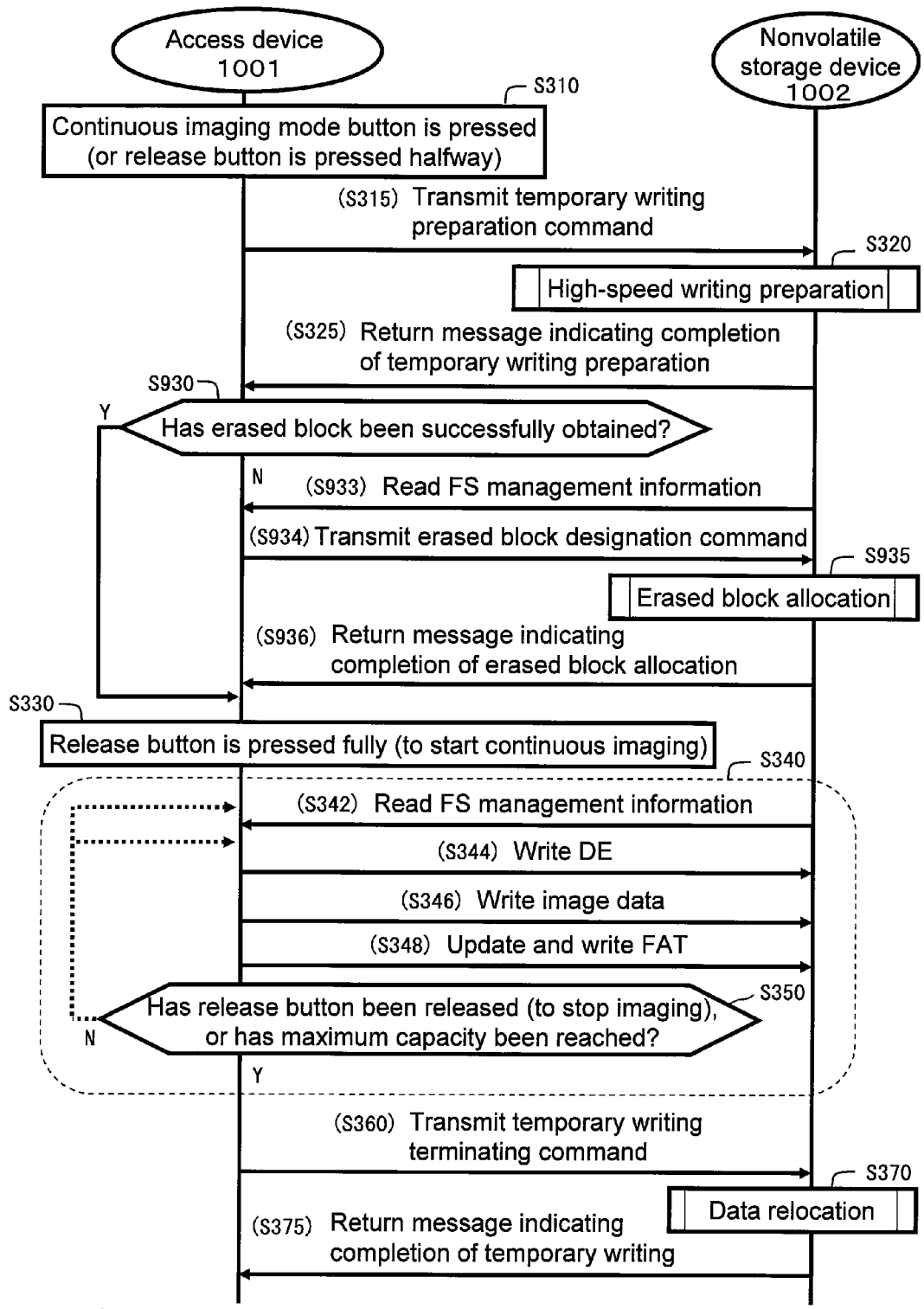
FIG. 10 shows a sequence of operation performed between an access device and a nonvolatile storage device according to a second embodiment of the present invention.

Although the erased block allocation process is performed after the continuous imaging mode button is pressed in FIG. 10, the present invention should not be limited to this method. For example, the erased block allocation process may be performed at any timing when the access device 1001 is not occupied by any processing, such as when the access device 1001 is powered on.

Although the access device 1001 designates an unoccupied cluster based on the read FS management information of the file system in FIG. 10 to designate the erased block, the present invention should not be limited to this method. For example, the nonvolatile storage device 1002 may internally have the file system, and the nonvolatile storage device 1002 may internally search for an unoccupied cluster to be used as an erased block.

Although an unoccupied cluster is detected based on the read FS management information of the file system, the present invention should not be limited to this method. For example, when the nonvolatile storage system includes a plurality of unoccupied clusters each having a small size, or in other words when the nonvolatile storage system includes a plurality of fragmented unoccupied clusters, the settings for writing into the temporary data storage area 273 may be once cleared, and the unoccupied clusters may be reorganized or more specifically a plurality of small clusters may be defragmented using the file system, and then the processing may be restarted from step S315, in which the temporary writing preparation command is transmitted.

Also, although the settings for data writing are changed in a manner that subsequently requested write data will be written into the temporary data storage area 273 by transmitting a temporary writing preparation command in FIG. 4 and FIG. 10, the present invention should not be limited to this method. For example, the nonvolatile storage system may prepare a special command for reading and writing in the temporary data storage area 273. The special command may be used to write the subsequently requested write data into the temporary data storage area 273, without requiring the temporary writing preparation command to be transmitted.

Further, although the nonvolatile memory 27 included in the nonvolatile storage device 1002 is shown as a single nonvolatile memory in FIG. 2, the nonvolatile memory 27 may include two or more nonvolatile memories.

Although the components of the access device 1001 are connected via the bus 17 in FIG. 2, the present invention should not be limited to this structure. The components of the access device 1001 may not be connected via the bus 17, or only some components of the access device 1001 may be connected via a bus.

Each block of the access device 1001 and the nonvolatile storage device 1002 described in the above embodiments may be formed using a single chip with a semiconductor device, such as LSI (large-scale integration), or some or all of the blocks of the access device and the nonvolatile storage device may be formed using a single chip. Although LSI is used as the semiconductor device technology, the technology may be IC (integrated circuit), system LSI, super LSI, or ultra LSI depending on the degree of integration of the circuit.

The circuit integration technology employed should not be limited to LSI, but the circuit integration may be achieved using a dedicated circuit or a general-purpose processor. A field programmable gate array (FPGA), which is an LSI circuit programmable after manufactured, or a reconfigurable processor, which is an LSI circuit in which internal circuit cells are reconfigurable or more specifically the internal circuit cells can be reconnected or reset, may be used.

Further, if any circuit integration technology that can replace LSI emerges as an advancement of the semiconductor technology or as a derivative of the semiconductor technology, the technology may be used to integrate the functional blocks. Biotechnology is potentially applicable.

The processes described in the above embodiments may be realized using either hardware or software (including an additional use of an operating system (OS), middleware, or a predetermined library), or may be realized using both software and hardware.

The sequence in which the processing described in the above embodiments is performed should not be limited to the processing sequence shown in the above embodiments, and the sequence in which the processing is performed may be changed without departing from the scope and spirit of the invention.

Although the above embodiments describe the case in which the access device and the nonvolatile storage device are separate apparatuses, the present invention should not be limited to this structure. The access device and the nonvolatile storage device may be incorporated in a single apparatus. Also, the access device may be an access module, and the nonvolatile storage device may be a nonvolatile storage module.

The specific structures described in the above embodiments are mere examples of the present invention, and may be changed and modified variously without departing from the scope and spirit of the invention.

INDUSTRIAL APPLICABILITY

The memory controller, the nonvolatile storage device, the access device, and the continuous imaging data writing system (nonvolatile storage system) of the present invention are useful for recording performed in an AV device, such as a moving image recorder or player, or a recorder for a communication device such as a portable telephone.

The invention claimed is:

1. A memory controller for controlling writing of data to a nonvolatile memory, the memory controller comprising:
a host IF unit that transmits and receives a command for controlling data writing to the nonvolatile memory, to or from an external unit;
a high-speed writing preparation unit that sets a mode of data writing to the nonvolatile memory to a high-speed writing mode when the host IF unit receives a high-speed writing preparation command instructing to prepare for performing a data writing process in the high-speed writing mode, the high-speed writing preparation command being a different command from a write command for writing data to the nonvolatile memory, from the external unit;
a high-speed writing processing unit that sequentially records write-target data to be written to the nonvolatile memory that has been received by the host IF unit from the external unit into a physical block of the nonvolatile memory from which data has been erased without using a logical address indicating a recording position of the write-target data when the mode of data writing is set to the high-speed writing mode; and
a data relocation unit that relocates, based on the logical address, the data that has been recorded into the physical block by the high-speed writing processing unit into a physical block corresponding to the logical address when the host IF unit receives a command indicating termination of the high-speed writing mode from the external unit.

2. The memory controller according to claim 1, further comprising:
an erased-block allocating unit that allocates a physical block from which data has been erased based on a logical address and a size of the write-target data that is to be written in the high-speed writing mode, wherein information about the logical address and the size of the write-target data is provided in advance from the external unit.

3. A nonvolatile storage device, comprising:
the memory controller according to claim 1; and
a nonvolatile memory that is controlled by the memory controller.

4. An access device that controls data writing to the nonvolatile storage device according to claim 3, the access device comprising:
a temporary writing preparation unit that transmits to the nonvolatile storage device a command instructing to switch to a high-speed data writing mode in which write-target data is to be recorded sequentially into a predetermined physical block of the nonvolatile memory irrespective of a logical address that is designated as an address at which the data is to be written;
a temporary writing unit that transmits user data and management data for managing the user data in a file system to the nonvolatile storage device; and
a temporary writing terminating unit that transmits a message indicating termination of high-speed data writing to the nonvolatile storage device.

5. The access device according to claim 4, further comprising:
an erased-block designation unit that searches for an unoccupied area in a logical address space based on file system management information recorded in the nonvolatile memory, and provides information about the unoccupied area as information about a logical address and a data size to the nonvolatile storage device.

6. A nonvolatile storage system, comprising:
the nonvolatile storage device according to claim 3; and
an access device that controls data writing to the nonvolatile storage device including the nonvolatile memory, the access device comprising:
a temporary writing preparation unit that transmits to the nonvolatile storage device a command instructing to switch to a high-speed data writing mode in which write-target data is to be recorded sequentially into a predetermined physical block of the nonvolatile memory irrespective of a logical address that is designated as an address at which the data is to be written;
a temporary writing unit that transmits user data and management data for managing the user data in a file system to the nonvolatile storage device; and
a temporary writing terminating unit that transmits a message indicating termination of high-speed data writing to the nonvolatile storage device.

7. A data writing method for writing data to a nonvolatile memory using a command, the method comprising:
receiving at least one of a command for controlling writing of data to the nonvolatile memory and data to be written to the nonvolatile memory;
setting a mode of data writing to the nonvolatile memory to a high-speed writing mode when a high-speed writing preparation command instructing to prepare for performing a data writing process in the high-speed writing mode, the high-speed writing preparation command being a different command from a write command for writing data to the nonvolatile memory, is received in the command/data receiving step;

sequentially recording write-target data to be written to the nonvolatile memory that has been received in the command/data receiving step into a physical block of the nonvolatile memory from which data has been erased without using a logical address indicating a recording position of the write-target data when the mode of data writing is set to the high-speed writing mode; and relocating, based on the logical address, data recorded into the physical block by the high-speed writing processing step into a physical block corresponding to the logical address when a command indicating termination of the high-speed writing mode is received in the command/data receiving step.

8. A non-transitory computer-readable medium storing a program for enabling a computer to implement a data writing method for writing data to a nonvolatile memory using a command, the method comprising:

receiving at least one of a command for controlling writing of data to the nonvolatile memory and data to be written to the nonvolatile memory;

setting a mode of data writing to the nonvolatile memory to a high-speed writing mode when a high-speed writing preparation command instructing to prepare for performing a data writing process in the high-speed writing mode, the high-speed writing preparation command being a different command from a write command for writing data to the nonvolatile memory, is received in the command/data receiving step;

sequentially recording write-target data to be written to the nonvolatile memory that has been received in the command/data receiving step into a physical block of the nonvolatile memory from which data has been erased without using a logical address indicating a recording position of the write-target data when the mode of data writing is set to the high-speed writing mode; and relocating, based on the logical address, data recorded into the physical block by the high-speed writing processing unit into a physical block corresponding to the logical address when a command indicating termination of the high-speed writing mode is received in the command/data receiving step.

* * * * *